UNITED STATES PATENT OFFICE.

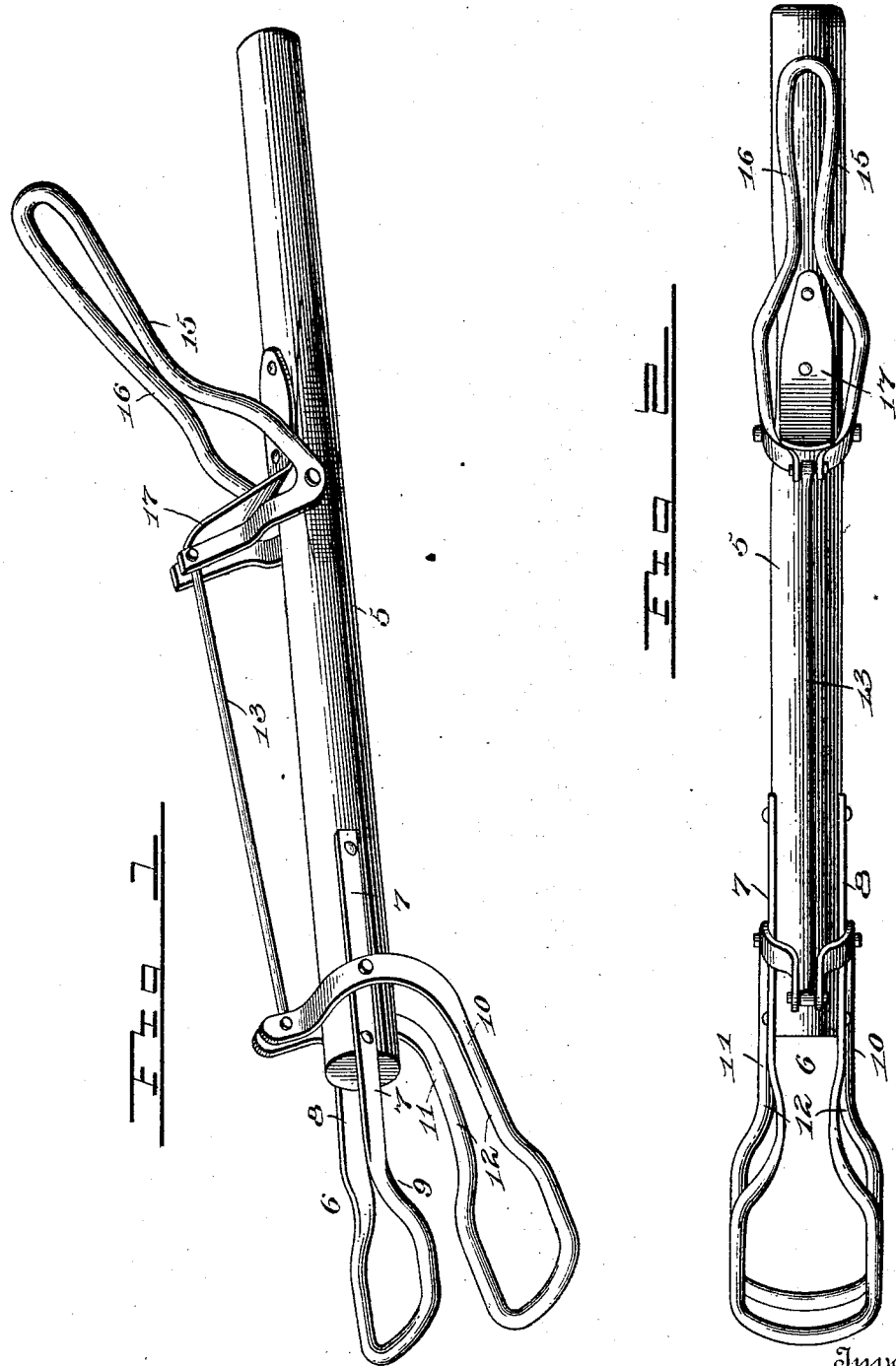

GILBERT H. SYVERSON, OF WALNUTGROVE, MINNESOTA.

TONGS.

SPECIFICATION forming part of Letters Patent No. 683,518, dated October 1, 1901.

Application filed March 25, 1901. Serial No. 52,790. (No model.)

*To all whom it may concern:*

Be it known that I, GILBERT H. SYVERSON, a citizen of the United States, residing at Walnutgrove, in the county of Redwood, State of Minnesota, have invented certain new and useful Improvements in Tongs; and I do hereby declare the following to be a full, clear, and exact description of the invention, such as will enable others skilled in the art to which it appertains to make and use the same.

This invention relates to clothes-tongs; and it has for its object to provide tongs particularly adapted for picking up clothing from a washboiler, a further object of the invention being to provide a construction that is cheap, simple, and durable.

In the drawings forming a portion of this specification, and in which like numerals of reference indicate similar parts in both views, Figure 1 is a perspective view showing the complete tongs in their open position. Fig. 2 is a top plan view of the tongs.

Referring now to the drawings, the present tongs consist of a stick 5 of wood similar to the ordinary clothes-stick, and to one end thereof is secured fixedly a jaw consisting of a metallic bar or rod 6, which is bent upon itself to form spaced arms 7 and 8, which adjacent to the bend 9 are bent outwardly to form a laterally-expanded gripping portion, as shown. The pivoted jaw of the tongs consists also of a metal rod or bar which is bent upon itself to form spaced arms 10 and 11 and a connecting-bend 12, the arms adjacent to the bend being also bent outwardly to form a laterally-expanded gripping portion which coöperates with the gripping portion of the fixed jaw. The arms 10 and 11, adjacent to their outer ends, are curved laterally and disposed at opposite sides of the stick 5 and upon the arms 7 and 8, to which they are pivoted, said arms 7 and 8, as shown, being riveted at opposite sides of the stick, which latter lies between them. The ends of the arms 10 and 11 are taken beyond the stick 5 and are then bent inwardly and then parallel, and between these parallel extreme end portions is disposed a connecting-rod 13, connected thereto by a pivot, so that as the connecting-rod is moved longitudinally in one direction the pivoted jaw will move toward the fixed jaw, and when the rod is moved in the opposite direction it will be moved away from the fixed jaw. To thus shift the connecting-rod, a handle is provided and consists of a rod or bar bent upon itself to form arms 15 and 16, which near to their outer ends are bent at right angles, and said arms at their angles are disposed at opposite sides of and pivoted to the stick 5, while the connecting-rod 13 is disposed between and pivoted to the extreme end portions of the arms. To hold the handle normally and yieldably in position, with the jaws separated, a leaf-spring 17 is mounted upon the stick 5 at a point between the arms 15 and 16 of the handle, and the free end thereof is bent upwardly and disposed against the ends of the arms to which the connecting-rod is pivoted. This spring acts also to hold the rear end of the handle outwardly, and thus if the tongs be grasped and the handle moved with its rear end toward the stick the connecting-rod will be pulled rearwardly and the pivoted jaw will be moved with its gripping portion in the direction of the fixed jaw to effect a gripping action.

It will be understood that in practice modifications of the specific construction shown may be made and that any suitable materials and proportions may be used for the various parts without departing from the spirit of the invention.

What is claimed is—

A device of the class described comprising a stick, a jaw comprising spaced arms fixed to opposite sides of the stick and having a connecting portion, a second jaw comprising spaced arms disposed transversely of and pivoted to the arms of the fixed jaw, a handle comprising spaced arms pivoted to opposite sides of the stick, a connecting-rod pivoted between the ends of the arms of the handle and pivoted jaw, and a leaf-spring fixed to the stick and having its free end disposed against end portions of the arms of the handle to hold the pivoted jaw normally and yieldably in open position.

In testimony whereof I hereunto sign my name, in the presence of two subscribing witnesses, on the 23d day of February, 1901.

GILBERT H. SYVERSON.

Witnesses:
F. F. GOFF,
J. BELLA EVANS.